US006990654B2

(12) United States Patent
Carroll, Jr.

(10) Patent No.: US 6,990,654 B2
(45) Date of Patent: Jan. 24, 2006

(54) XML-BASED GRAPHICAL USER INTERFACE APPLICATION DEVELOPMENT TOOLKIT

(75) Inventor: Thomas J. Carroll, Jr., Denver, CO (US)

(73) Assignee: BEA Systems, Inc., San Jose, CA (US)

( * ) Notice: Subject to any disclaimer, the term of this patent is extended or adjusted under 35 U.S.C. 154(b) by 681 days.

(21) Appl. No.: 09/953,050

(22) Filed: Sep. 14, 2001

(65) Prior Publication Data

US 2002/0085020 A1    Jul. 4, 2002

Related U.S. Application Data

(60) Provisional application No. 60/232,515, filed on Sep. 14, 2000.

(51) Int. Cl.
*G06F 9/44*    (2006.01)

(52) U.S. Cl. .................... 717/109; 715/513; 715/762

(58) Field of Classification Search ............... 717/109, 717/104, 105, 113, 114, 116, 123, 143; 715/500, 715/513, 760, 762, 763
See application file for complete search history.

(56) References Cited

U.S. PATENT DOCUMENTS

| 5,450,540 | A | 9/1995 | Spohrer et al. | ............. 395/155 |
|---|---|---|---|---|
| 5,495,567 | A | 2/1996 | Iizawa et al. | ................ 395/161 |
| 5,973,682 | A | 10/1999 | Saib et al. | .................... 345/327 |
| 6,230,117 | B1 | 5/2001 | Lymer et al. | ................. 703/22 |
| 6,237,136 | B1 | 5/2001 | Sadahiro | ......................... 717/2 |

OTHER PUBLICATIONS

Schafer. "Graphical Interactions with an Automatic Programming System." IEEE. pp. 575-591. 1988.

Begg et al. "Intelligent Graphical Interface Design: Designing and Interactive Control Room User Interface." IEEE. pp. 3128-3232. 1995.
http://developer.java.sun.com/developer/.
http://java.sun.com/xml/.
M. Fowler, K. Scott, and G. Booch, *UML Distilled: Applying the Standard Object Modeling Language*, Addison-Wesley Publishing Co., Reading, MA (1997). (Table of Contents Only).
http://www.megginson.com/SAX/index.html.
Topley, Kim. Core Java Foundation Classes. Upper Saddle River, NJ: Prentice-Hall, 1998. (Table of Contents Only).
http://www.w3.org (Home Page).
http://www.w3.org/XML/.
http://www.w3.org/XML/1998/06/xmlspec-report-19980910.htm.
http://developer.java.sun.com/developer/, Jan. 2002.
http://java.sun.com/xml/, undated.
http://www.megginson.com/SAX/index.html, Nov. 2001.
http://www.w3.org (Home Page), Dec. 2001.
http://www.w3.org/XML/, Apr. 1997.
http://www.w3.org/XML/1998/06/xmlspec-report-19980910.htm, Sep. 1998.

*Primary Examiner*—Antony Nguyen-Ba
(74) *Attorney, Agent, or Firm*—Fliesler Meyer, LLP

(57) ABSTRACT

The invention as disclosed herein relates to a system and a method for creating user interfaces for software applications. Particularly, the invention allows a developer to segregate the development of the user interface from the development of the underlying application logic. In one embodiment of the invention, an applications graphical user interface is specified using an XML document as an application interface file. At application compile time this application interface file is parsed, and the specifications therein used to retrieve graphical screen components from an interface library to create the user interface. A grammar file can be used to further specify the parsing of the application interface file, and impose consistency upon the interface development process.

67 Claims, 12 Drawing Sheets

```
<?xml version="1.0"?>
<!DOCTYPE joy SYSTEM "file:/beadev/src/com/bea/joy/xml/joy.dtd">
<joy>
   <mainWindow name="joyMainWindow"
               initialLocation="screen"
               size="300x200"
               title="Joy">
     <menuBar>
        <menu name="fileMenu"
              text="File">
           <menuItem name="exitMenuItem"
                     text="Exit">
           </menuItem>
        </menu>
     </menuBar>

<clientArea>
        <label name="label"
               text=Happy Happy, Joy Joy!">
        </label>
     </clientArea>
   </mainWindow>
</joy>
```

An XML document that describes an application's graphical user interface.

FIG. - 1

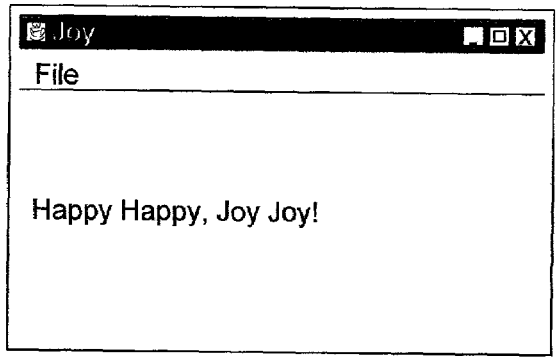

A graphical user interface defined by the XML document in figure 1.

FIG. - 2

The hierarchy of components for the application shown in figure 2.

```
<tag>The element's content</tag>
```

An XML element.

```
<tag attribute1="value1" attribute2="value2">The element's content</tag>
```

An XML element with attributes.

```
<tag attribute1="value1" attribute2="value2"/>
```

An empty XML element with attributes.

```
<?xml version="1.0"?>
<!DOCTYPE joy SYSTEM "file:/beadev/src/com/bea/joy/xml/joy.dtd">
<joy>
    <mainWindow name="joyMainWindow"
                initialLocation="screen"
                size="300x200"
                title="Joy">
        <menuBar>
            <menu name="fileMenu"
                  text="File">
                <menuItem name="exitMenuItem"
                          text="Exit">
                </menuItem>
            </menu>
        </menuBar>

<clientArea>
            <label name="label"
                   text="Happy Happy, Joy Joy!">
            </label>
        </clientArea>
    </mainWindow>
</joy>
```

- XMLdeclaration
- Root element
- Document Type Declaration

An XML document that describes an application's graphical user interface

FIG. - 7

```
<!ELEMENT mainWindow ( aboutDialog    | %borders;
                                      | clientArea
                                      | dialog
                                      | image
                                      | menuBar
                                      | statusBar
                                      | toolbar )* >
<!ATTLIST mainWindow  class            NMTOKEN          #IMPLIED
                      icon             CDATA            #IMPLIED
                      initialLocation  %windowLocations;   "screen"
                      name             NMTOKEN          #IMPLIED
                      opaque           %booleanValues;  "false"
                      size             CDATA            #IMPLIED
                      title            CDATA            #IMPLIED
```

The rules within the DTD that define the `<mainWindow>` element.

FIG. - 8

```
>!ENTITY % booleanValues "( true |  false |  yes  |  no  |  on  |  off )">
<!ENTITY % borders "( bevelBorder  | emptyBorder
                                   | etchedBorder
                                   | lineBorder
                                   | matteBorder
                                   | titleBorder )*">
<!ENTITY % locations "( center
                        | east | right
                        | north | top
                        | northeast
                        | northwest
                        | south | bottom
                        | southeast
                        | southwest
                        | west | left )">
```

Entity definitions.

FIG. - 9

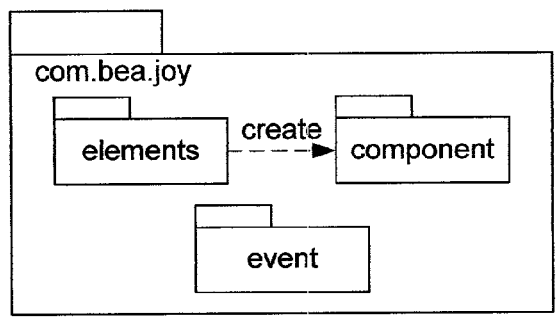

A UML package diagram of the Joy user interface library.

FIG. - 10

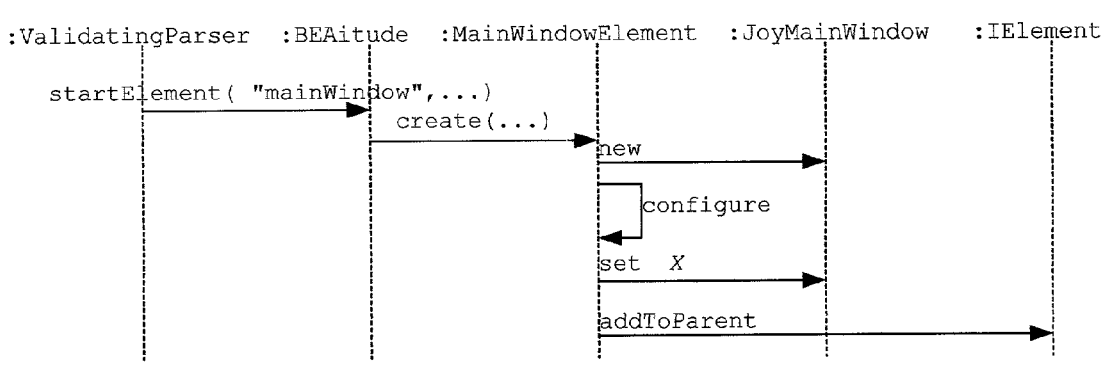

A UML sequence diagram showing the creation of a main window component

FIG. - 11

```
mainWindow              = com.bea.joy.elements.MainWindowElement
matteBorder             = com.bea.joy.elements.MatteBorderElement
menue                   = com.bea.joy.elements.MenuElement
menuBar                 = com.bea.joy.elements.MenuBarElement
menuButton              = com.bea.joy.elements.MenuButtonElement
menu                    = com.bea.joy.elements.MenuElement
menuItem                = com.bea.joy.elements.MenuItemElement
messageDialog           = com.bea.joy.elements.MessageDialogElement
overlayLayout           = com.bea.joy.elements.OverlayLayoutElement
panel                   = com.bea.joy.elements.PanelElement
popupMenu               = com.bea.joy.elements.PopupMenuElement
progressBar             = com.bea.joy.elements.ProgressBarElement
radioButton             = com.bea.joy.elements.RadioButtonElement
radioButtonGroup        = com.bea.joy.elements.RadioButtonGroupElement
radioButtonMenuItem     = com.bea.joy.elements.RadioButtonMenuItemElement
scrollPane              = com.bea.joy.elements.ScrollPaneElement
separator               = com.bea.joy.elements.SeparatorElement
splashWindow            = com.bea.joy.elements.SplashWindowElement
splitPane               = com.bea.joy.elements.SplitPaneElement
```

A portion of the property file for the BEAtitude class.

FIG. - 12

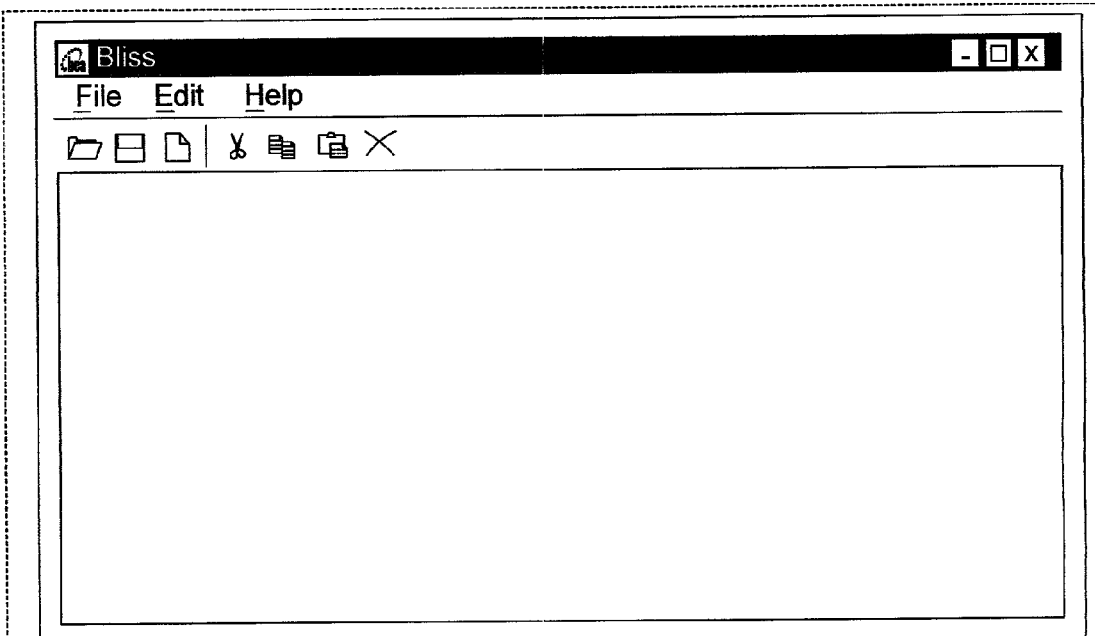

The Bliss application

FIG. - 14

```
<!ELEMENT joy ( ( action )*,
              ( model? ),
              ( componet? | mainWindow? | splashWindow? )+ ) >
<!ATTLIST joy helpDocument  CDATA              #IMPLIED
              lookAndFeel   %lookAndFeels;     "default">
```

Rules in the Joy DTD that define the <joy> element

FIG. - 15

```
<!ENTITY % lookAndFeels "( default | mac | metal | motif | windows )">
```

Rules in the Joy DTD that define the <joy> element

FIG. - 16

```
        <!DOCTYPE joy SYSTEM "file:/beadev/src/com/bea/joy/xml/joy.dtd">
<joy> lookANDFeel="metal">
  <action name="open"/>

<mainWindow>
    <menuBar>
      <menu text="File">
        <menuItem name="openMenuItem"
                  action="open"
                  text="Open">
        </menuItem>
      </menu>
    </menuBar>

<toolbar>
      <button name="openButton"
              action="open"
              text=Open">
      </button>
    </toolbar>
  </mainWindow>
</joy>
```

An XML document that illustrates how an action is defined, and
how that action can be associated with multiple components.

FIG. - 17

```
<!ELEMENT action Empty>
<!ATTLIST action enabled      %booleanValues;   "true"
                 icon         CDATA             #IMPLIED
                 name         CDATA             #REQUIRED
                 rolloverIcon CDATA             #IMPLIED
                 statusIcon   CDATA             #IMPLIED
                 statusMessage CDATA            #IMPLIED>
```

The rules that define the action element.

FIG. - 18

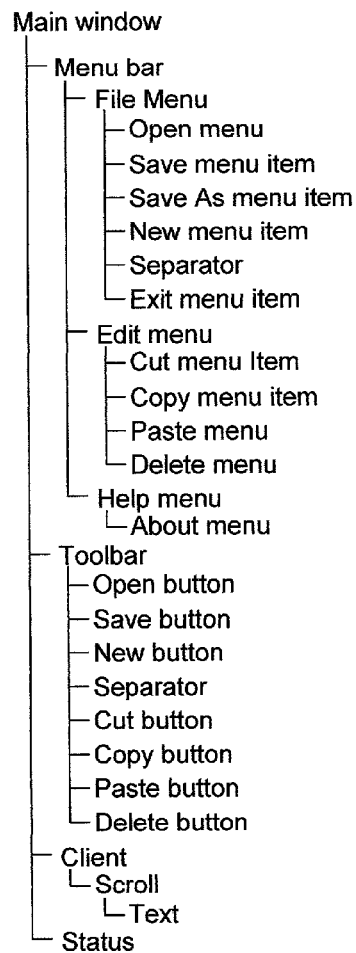

```
Main window
   ├─ Menu bar
   │    ├─ File Menu
   │    │    ├─ Open menu
   │    │    ├─ Save menu item
   │    │    ├─ Save As menu item
   │    │    ├─ New menu item
   │    │    ├─ Separator
   │    │    └─ Exit menu item
   │    ├─ Edit menu
   │    │    ├─ Cut menu Item
   │    │    ├─ Copy menu item
   │    │    ├─ Paste menu
   │    │    └─ Delete menu
   │    └─ Help menu
   │         └─ About menu
   ├─ Toolbar
   │    ├─ Open button
   │    ├─ Save button
   │    ├─ New button
   │    ├─ Separator
   │    ├─ Cut button
   │    ├─ Copy button
   │    ├─ Paste button
   │    └─ Delete button
   ├─ Client
   │    └─ Scroll
   │         └─ Text
   └─ Status
```

The hierarchy of components in the Bliss application's user interface.

FIG. - 19

| icon | File name |
| --- | --- |
| | about16x16.gif |
| | about16x16bw.gif |
| | bea_logo16x16.gif |
| | closed_folder16x16.gif |
| | closed_folder16x16bw.gif |
| | copy16x16.gif |
| | copy16x16bw.gif |
| | cut16x16.gif |
| | cut16x16bw.gif |
| | delete16x16.gif |
| | delete16x16bw.gif |
| | details16x16.gif |
| | details16x16bw.gif |
| | document16x16.gif |
| | document16x16bw.gif |
| | exit16x16.gif |
| | exit16x16bw.gif |
| | file16x16.gif |
| | file16x16bw.gif |
| | home16x16.gif |
| | home16x16bw.gif |
| | listview16x16.gif |
| | listview16x16bw.gif |
| | open_folder16x16.gif |
| | open_folder16x16bw.gif |
| | paste16x16.gif |
| | paste16x16bw.gif |
| | save_as16x16.gif |
| | save_as16x16bw.gif |
| | save16x16.gif |
| | save16x16bw.gif |
| | updir16x16.gif |
| | updir16x16bw.gif |

Sample Icons.

FIG. -23

XML-BASED GRAPHICAL USER INTERFACE APPLICATION DEVELOPMENT TOOLKIT

CLAIM OF PRIORITY

This application claims priority from provisional application "XML-BASED GRAPHICAL USER INTERFACE APPLICATION DEVELOPMENT TOOLKIT", Application No. 60/232,515, filed Sep. 14, 2000, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to computer graphical user interfaces, and specifically to a system and a method for utilizing an interface library to create application interfaces.

BACKGROUND

Successful software user interface design requires adherence to rules and heuristics that are traditionally available from user interface design literature and user interface standards guidelines. These rules are typically expressed in everyday human-language, and not in ways that computers can readily understand them. Because of this, the act of creating a user interface that complies to standard guidelines is often an ad-hoc process that suffers because different designers often have different interpretations of the same rules. This in turn leads to results that are not easily reproducible.

Several systems and methods currently exist to allow a programmer to develop a user software application. Such systems or development suites include VISUAL STUDIO™ Integrated Development Environment (hereafter Visual Studio) from Microsoft Corp., DELPHI™ Integrated Development Environment (hereafter Delphi) from Borland Software Corp., and VISUAL CAFÉ™ Integrated Development Environment (hereafter Visual café) from Symantec Corp., together with the programming languages which underlie these development suites, e.g. C, C++, BASIC, or JAVA™ programming language (hereafter Java). However, with all of these development methods, care must be taken to develop the user interface in accordance with the underlying logic of the application. Although separate tools can be used for each aspect of the development process, the developer (or developers) must typically be aware of each aspect so as to achieve consistent results.

To this end, several toolkits including the JAVA Swing toolkit have been developed to assist in the user interface development process. Newer technologies such as the Extensible Markup Language (XML) and document type definition (DTD) have allowed the development of platform- and application-independent interfaces and layouts. Object modeling techniques such as the Unified Modeling Language (UML) assist the developer in visualizing or managing the interface development process.

Further information about these, and related topics can be found in the following references, incorporated herein by reference:

Java JAVA Developer Connection. http://developer.java-.sun.com/developer/ http://java.sun.com/xml/

UML Fowler, Martin and Kendell Scott. UML Distilled Applying the Standard Object Modeling Language. Reading, Mass.: Addison-Wesley, 1997.

SAX™ (SAX XML Parser, hereafter SAX) http://www-.megginson.com/SAX/index.html

SWING™ (SWING User Interface libraries, hereafter SWING) Topley, Kim. Core Java Foundation Classes. Upper Saddle River, N.J.: Prentice-Hall, 1998.

WWW http://www.w3c.org

XML http://www.w3.org/XML/

DTD http://www.w3.org/XML/1998/06/xmlspec-report-19980910.htm

As used herein the terms Java™, and SWING™ are trademarks of Sun Microsystems, Inc. The terms Windows™, and VISUAL STUDIO™ are trademarks of Microsoft Corporation. The term DELPHI™ is a trademark of Borland Software Corp. The terms WebLogic™, and WebLogic Server™ are trademarks of BEA Software, Inc. The term VISUAL CAFÉ™ is a trademark of Symantec Corp.

However, each of these tools address only one aspect of the problem—i.e. either the application logic portion or the graphical user interface. There is a general desire in software development to segregate the two goals of the development process (the application logic and the application interface or appearance) so that the underlying application may be reused, and a user interface simply and separately programmed and placed on top.

There is also a desire to have a development system which allows the creation or enforcement of a set of development guidelines, that can then be used to enforce restrictions upon the developer, and thus ensure a level of standardization throughout an organization.

SUMMARY

The invention addresses the desire to segregate the various application or software logic, and interface design aspects, of the application development process. Roughly described, the invention relies on declaratively specifying the design of a computer application's user interface. This is in contrast to the current imperative methods of specifying a user interface, that work primarily by developing application code that then constructs the user interface. The invention can be included in an application development system or suite, to allow for the rapid development of graphically-rich applications in a consistent manner. Advantages of the present invention include:

Less Need for Coding

In accordance with one embodiment of the invention, an application's user interface is declaratively specified as an easily-programmed XML document. The XML document is parsed at application compile time, in accordance with a set of predefined rules, to create the application user interface.

Formalization of Good User Interface Design Rules

As used with the invention, the XML documents that describe a user interface are associated with an XML Data Type Definition (DTD) file and an XML Schema. Both the DTD and the Schema are XML documents that formally describe the syntax (a "grammar") for the XML documents that are then used to describe an application's user interface.

These grammars impose the rules of user interface design as further specified within typical user interface standards guidelines such as, The Windows Interface Guidelines for Software Design, The OSF/Motif Style Guide, and the JAVA Look and Feel Design Guidelines. Because the user interfaces are specified declaratively within XML documents, these XML documents can be checked for correctness. In this context "correctness" equals conformance to user interface design guidelines.

Applications May Provide Guidance to User Interface Designers

Since the rules of user interface design are encoded in a manner that a computer can process them (as XML documents), the invention provides a way to construct a computer application that in turn guides user interface developers through the user interface design process. For example, an application can enforce the rules of how user interface elements (menus, toolbars, etc.) are composed, so that the resulting application user interface conforms to the style guidelines of its target environment.

In accordance with one embodiment, the invention comprises a system for generating an application graphical user interface, comprising: a parser, for parsing an application source code file, application interface file, interface grammar file, and interface library, to generate an application graphical user interface; an application source code file for an application, specifying an application logic; an application interface file specifying a plurality of graphical elements within an interface library to be displayed for said application; an interface grammar file specifying rules to be used in parsing said application interface file; and, an interface library comprising a plurality of graphical elements to be retrieved by said parser in accordance with the specifications of said application interface file and said interface grammar file.

In another embodiment the invention comprises a system for development of an application graphical user interface, comprising: means for creating an application source code file specifying an application logic; means for creating an application interface file specifying a plurality of graphical elements within an interface library to be displayed for said application; means for creating an interface grammar file specifying rules to be used in parsing said application interface file; an interface library comprising a plurality of graphical elements to be retrieved in accordance with the specification of said application interface file and said interface grammar file; and, a parser, for parsing said application source code file, said application interface file, and said interface grammar file, retrieving said plurality of graphical elements from said interface library, and generating an application graphical user interface.

In a further embodiment the invention comprises a system for allowing consistency verification of an application user interface for an application in a graphical user interface development system, comprising: an interface library comprising a plurality of graphical elements; means for parsing an application interface file, said application interface file specifying a plurality of graphical elements within said interface library to be displayed for said application; means for parsing an interface grammar file, said interface grammar file specifying rules to be used in parsing said application interface file and retrieving said plurality of graphical elements; and, means for retrieving from said interface library a plurality of graphical elements, in accordance with the rules applied by said interface grammar file during parsing.

BRIEF DESCRIPTION OF THE FIGURES

FIG. 1 shows an example of an XML document or user interface file that describes an application's graphical user interface.

FIG. 2 shows a graphical user interface defined by the XML document in FIG. 1.

FIG. 7 shows an example of an XML document that describes an application's graphical user interface.

FIG. 8 shows for an embodiment of the invention the rules within the DTD or grammar file that define the main Window element.

FIG. 9 shows example entity definitions.

FIG. 10 shows for an embodiment of the invention a UML package diagram of the graphical user interface referred to herein as "Joy".

FIG. 11 shows for an embodiment of the invention a UML sequence diagram showing the creation of a main window component.

FIG. 12 shows for an embodiment of the invention a portion of a property file for the BEAtitude class.

FIG. 14 shows a sample application referred to herein as "Bliss", developed using the invention.

FIG. 15 shows for an embodiment of the invention the rules in the DTD file that define the <joy> element.

FIG. 16 shows for an embodiment of the invention additional rules that define the <joy> element.

FIG. 17 shows an example XML document that illustrates how an action is defined, and how that action can be associated with multiple components.

FIG. 18 shows for an embodiment of the invention the rules that define the action element.

FIG. 19 shows the hierarchy of components in the Bliss sample application's user interface.

FIG. 23 shows sample icons used in an embodiment of the invention.

Figures 3, 4, 5, 6:
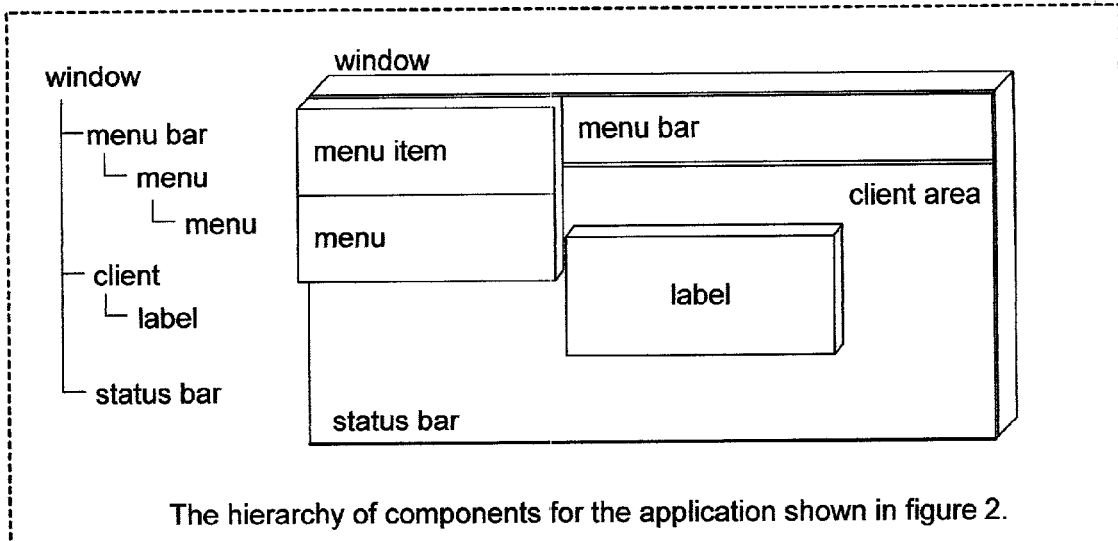
FIG. 3 shows the hierarchy of components for the application shown in FIG. 2.
FIG. 4 shows an example of an XML element.
FIG. 5 shows an example of an XML element with attributes.
FIG. 6 shows an example of an empty XML element with attributes.

Appendix A contains an example of an XML file for use with the invention bliss.xml file.

Appendix B contains the Bliss application's source code.

Appendix C contains the source code for the BEAtitude class of the Joy user interface library.

DETAILED DESCRIPTION

Roughly described, an embodiment of the invention comprises a system and a method that utilizes a graphical User Interface Library—a collection of JAVA classes and interfaces that take graphical interface definition files (in one embodiment XML documents) as input, and create an application's user interface from the documents' content. This process allows programmers to rapidly create engaging, internationalized graphical user interfaces with significantly less coding than would have been otherwise necessary. In this manner, building an application's user interface requires nothing more than a text editor.

The User Interface Library allows JAVA developers to segregate application logic from application presentation (i.e., the user interface). Using the system, an application's graphical user interface is specified within XML documents. The Interface Library is then used to construct the application's user interface from the contents of the XML documents when the application is started. This allows an application to have multiple presentations (user interfaces) that can be targeted to particular users or groups of users, or to different computing environments (for example, for use in personal computers, personal digital assistants, or cell phones).

Glossary

The following glossary will be useful in understanding the various description of embodiments of the invention that follows.

Abstract Window Toolkit (AWT)

A library of classes and interfaces for building platform-independent graphical user interfaces for JAVA applications and applets. AWT is a standard component of the Java programming language. The classes within the AWT library map to or "wrap" the user interface components of the host window system.

Applet

A type of JAVA application that runs within a web browser. For security reasons, applets run within a secured environment that can constrict what they can do (for example, altering files). JAVA applications run outside of the secured environment and have no restrictions.

Class

See JAVA class.

Client Area

The area within a main window or dialog window that remains once the window's menu bar, tool bars, command buttons, and status bar have been positioned.

Clipboard

See system clipboard.

Command Shell

An application that allows the user to enter type commands to a computer's operating system.

Component

See user interface component.

Constructor

A method (subroutine) of a class that is invoked when an instance of the class is created.

Dialog Window

A window within an application that is subordinate to the application's main window.

Document Type Definition (DTD)

See XML DTD.

Drop-down Menu

A menu that is displayed from a menu bar.

Element

See XML element.

Empty Element

See XML empty element.

Enterprise Java Bean (EJB)

A software object, written in the JAVA programming language, that runs within an application server and conforms to the Enterprise JAVA Bean standard.

Extensible Style Language (XSL)

An XML grammar used to create documents that describe how to data within XML documents are transformed.

Hash Table

An abstract data type in which values are retrieved by a key string. Ideally, the average time to retrieve an element from a hash table should not increase as the number of elements in the hash table increases.

Interface

See JAVA interface.

Interface Library

See User Interface Library

Internationalization

The process of engineering an application so that it can be ported to any language or locale without requiring further re-engineering or re-compilation.

JAVA

An object-oriented programming language developed by Sun Microsystems, Inc.

JAVA class

In the dava JAVA programming language, a class is a data structure definition that is used to create objects (structured variables). A class is a definition of which objects are members of a class (set) of objects.

JAVA Interface

In the JAVA programming language, an interface is a class definition that cannot contain state (variables) or behavior (methods). It is an explicit declaration of what operations a class (set) of objects must implement.

JAVA Main Function

In the JAVA programming language, a class may have a function called "main" that can be the starting point of execution for a JAVA application or applet.

JAVA Package

In the JAVA programming language, a package is a collection of classes and interfaces. Packages can be hierarchically nested, with packages containing sub-packages. Packages form name-spaces within JAVA.

JAVA Property File

A text file that is associated with a JAVA class. Multiple property files may be associated with a class. The JAVA Runtime Environment (JRE) loads the property files that match the user's language and locale settings. This allows JAVA application's to retrieve values in a language- and locale-independent manner in support of internationalization and localization.

JAVA Runtime Environment (JRE)

Software that executes JAVA applications or applets.

Locale

An area that shares a common language and cultural conventions.

Localization
   The process of enabling an application to be used within a given location by adhering to the location's language and customs.

Main Function
   See JAVA main function.

Main Window
   An application's window that typically contains the application's menus.

Menu Bar
   A user interface component that typically runs along the top of an application's main window, and typically contains drop-down menus.

Package
   See JAVA package.

Package Diagram
   See UML package diagram.

Parser
   Software that, using a set of grammatical rules, recognizes the language specified by the grammar.

Pixel
   An atomic (non-divisible) element of an image for display on a screen or similar display device. A pixel is a single dot or square of color.

Property File
   See JAVA property file.

Pull-down Menu
   See drop-down menu.

Sequence Diagram
   See UML sequence diagram.

Shell
   See command shell.

Simple API for XML (SAX)
   Standard interface for event-based XML parsing.

Swing User Interface Library
   A collection of reusable JAVA classes and interfaces for building cross-platform graphical user interfaces. The SWING library is a standard component of the JAVA programming language. In contrast to the AWT User Interface Library, components within the SWING library do not "wrap" the user interface components provided by the host operating system, but are written completely in JAVA.

Status Bar
   A user interface component that is typically located along the bottom edge of a window. It is used to display information like status messages and progress indication.

Sun Microsystems, Inc.
   A software and hardware vendor that was a primary developer of JAVA (and currently owns the JAVA trademark).

System Clipboard
   A memory buffer used to store data that is cut or copied from an application.

Tag
   See XML tag.

Text Area Component
   A user interface component that allows a user to view, and edit, multiple lines of text.

Toolbar
   A user interface component that typically contains a group of buttons that represent frequently used features of an application.

UML Package Diagram
   A type of diagram defined by the Universal Modeling Language (UML). Package diagrams show collections of classes and their dependencies.

UML Sequence Diagram
   A type of diagram defined by the Universal Modeling Language (UML). Sequence diagrams show the messages passed between objects over time.

Unified Modeling Language (UML)
   A standard notation for depicting the design of object-oriented software.

Universal Resource Identifier (URI)
   Text strings that refer to Internet resources.

User Interface Component
   An object within an application that is part of that application's graphical user interface. Components have a visual representation within an application's user interface. Examples include: windows, buttons, labels, menus, etc.

User Interface Library/Interface Library
   A collection of reusable JAVA classes and interfaces that allow programmers to build graphical user interface applications where the user interface is declared within XML documents. As described herein, the invention uses an embodiment of a User Interface Library.

White Space
   A sequence of tab characters, blanks, new lines, carriage returns, or other characters that do not have a visual representation.

Window Component
   A user interface component that is managed by the host computer's graphical user interface presentation manager. A window is an area of the screen that contains an application's components. Windows often are the top-level (root) component of an application's graphical user interface.

World Wide Web Consortium (W3C)
   The organizational or industry body that promotes and develops standards for use with the World Wide Web.

XML
   Extensible Markup Language: a format for structured data and documents.

XML Document
   A logical unit of XML. A document contains declarations, elements, comments, entity references, character references, and processing instructions.

XML Document Type Definition (DTD)
   A formal definition for a type of XML document. The DTD defines a grammar that all XML documents that adhere to the DTD must follow in order for the documents to be considered valid.

XML Element
   Every XML document contains one or more elements. Elements are bounded by start and end tags (or in the case of empty elements, a start tag only). Each element has a type, identified by its name. Elements may contain attributes and content.

XML Empty Element

An XML element that has no content and is bounded by a start tag only (no ending tag).

XML Entity

An identifier within an XML DTD that represents a value.

XML Tag

A sequence of characters that are used to indicate the start and end of an XML element.

Section 1 of this document uses a simple example to define what an embodiment of the User Interface Library of the invention is, and how it works. This section also introduces some concepts—like XML and JAVA user interface development—that the User Interface Library relies upon. Section 2 discusses the architecture of one embodiment of the User Interface Library. This section should help the reader gain a better understanding of what the library does, what its design goals are, and how it has been engineered to meet those goals. Section 3 is aimed primarily at developers who will use the library, and includes a tutorial that walks the reader through the process of using the library to construct a text editor application. The tutorial assumes that the reader is comfortable with the JAVA programming language and XML. Section 4 lists various benefits provided by the invention. Sections 3 and 4 make occasional reference to the "Joy Interface Library", or to "Joy" functions. "Joy" is a specific example of one embodiment of the invention.

The convention used within this document is that excerpts of programming code, the names of programming items (like class names and method names), commands, file and directory names are set in fixed-width courier font.

1. Operation of the Invention

Figure 24:
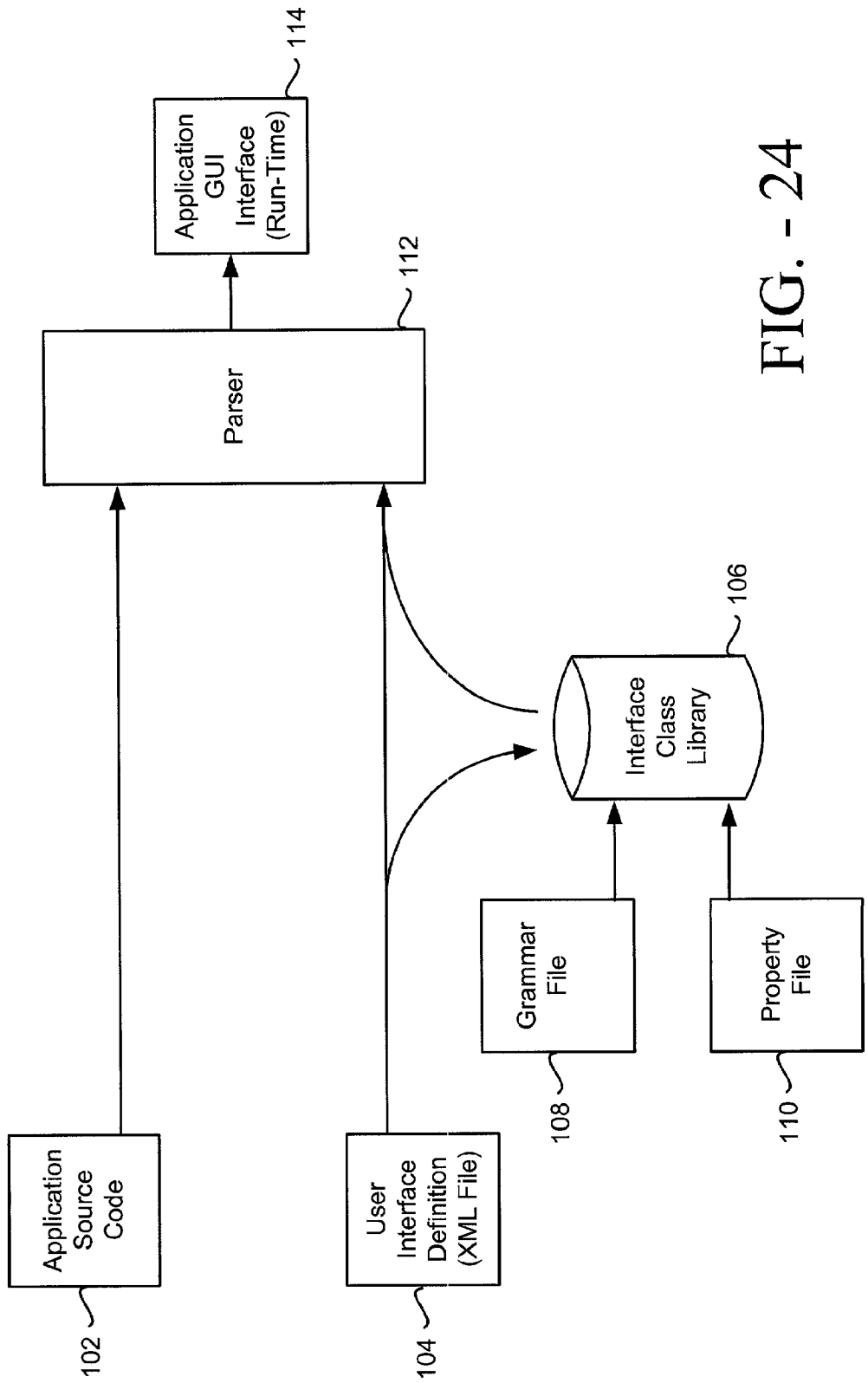
FIG. 24 shows a schematic of a system for generating user interfaces in accordance with an embodiment of the invention.

A high-level logical overview or schematic of a system used to operate the invention is shown in FIG. 24, and discussed in further detail below. A system such as shown could be incorporated into a software application development system for the development of a graphically rich application. In summary, as shown in FIG. 24, the system comprises a parser 112. During the application compilation process, the parser 112 uses information both in the application source code 102 and the user interface definition file 104 to create the applications' graphical user interface 114. The development suite includes an interface class library 106, from which the application source code 102 selects graphical elements appropriately specified by the user interface definition file 104. A grammar file 108 determines rules and/or dependencies to be applied during the compilation/parsing process, and ensures consistency throughout the graphical user interface development process. A property file 110 can be used to map to a subset of graphical elements in the interface class library. In certain implementations the parser and library may considered a single entity—in which case the act of calling the library functions initiates or includes the parsing process.

An embodiment of the User Interface Library relies on the classes and interfaces provided by JAVA's AWT and SWING libraries. The Interface Library parses the contents of XML documents and uses that information to create and configure SWING user interface components. FIG. 1 shows a simple example of an XML file passed as input to the Joy library parser. During parsing, the Interface Library takes or accepts the XML document shown in FIG. 1 and in this instance creates a graphical user interface that looks like that of FIG. 2.

A JAVA application's graphical user interface is composed of a hierarchy of components. Window components are at the top level. They contain child components, which contain other components, and so on. The hierarchy of components within the user interface shown in FIG. 2 is illustrated in FIG. 3. It can be seen that the nested structure of the XML document in FIG. 1 matches or mirrors the nesting of components within the application's user interface, as shown in FIG. 3.

XML documents are made up of or comprised of elements, which can be nested within each other. Tags determine the contents of an element within an XML document. In one embodiment, a tag is a piece of text that appears within angle brackets. The following code example (also shown in FIG. 4) depicts an XML element:

<tag>The element's content</tag>

This example shows the most common type of XML element, one that starts with a begin tag (<tag>) and ends with an end tag (</tag>). Tags are enclosed within angle brackets (< >) with ending tags beginning with a less than sign followed by a slash (</). Data between tags are the element's content. In addition to content, an XML element may also have attributes. Attributes are name-value pairs that are placed within an element's starting tag. The following example code (also shown in FIG. 5) depicts an element with two attributes. Attribute values can be enclosed within double quotes.

<tag attribute1="value1" attribute2="value2"> The element's content</tag>

A single tag can also be used to represent XML elements. Elements represented by a single tag are herein referred to as empty elements because they do not contain any content. However, they may contain attributes. The following code (also shown in FIG. 6) shows an example of an empty element.

<tag attribute 1="value1" attribute2="value2"/>

An empty element begins with a less than (<)sign, followed by the element's name ("tag" in the preceding example). White space (any combination of tab characters, blanks, new lines, etc.) separates the name of the element from its attributes (if any). An empty element is ended by a slash followed by a greater than sign (/>). FIG. 7 shows an XML document that describes an applications graphical user interface.

The User Interface Library takes various (i.e. a plurality of) XML elements from XML documents and creates a user interface that corresponds to the document's elements. Referring to the XML document from FIG. 1 again, it will be seen that all XML documents to be used with the invention begin with an XML declaration. This declaration indicates the version of the XML specification that the document's content adheres to. Following the XML declaration, an XML document also contains a Document Type Declaration, or DTD. A DTD defines the elements, entities, and attributes that an XML document may contain. It also defines a grammar (a set of rules) for how these items may be combined within an XML document. The DTD's content may be placed within the XML document itself, or the XML document may refer to a separate file that contains the DTD. This file can be identified using the file's name if the DTD file is on the same computer as the XML file, or it can be referred to via a Universal Resource Identifier (URI) if the file is located somewhere on a network. The previous example uses a DTD file called "joy.dtd". A DTD defines a root element, which is the element within an XML document that contains all of the document's other elements. The root element's name is typically (and in some embodiments always) the same name as the document's DTD.

An embodiment of the User Interface Library takes one or more XML documents as input into the parsing or rendering process, so as to generate a graphical user interface. Each XML document refers to an XML DTD that specifies the answers to the following questions:

Which elements can the documents contain?

How can the elements be nested?

What attributes can each element have?

What are the allowed values for an attribute?

Is an attribute required, or is it optional?

What is a particular attribute's default value?

FIG. 8 shows the rules within an example of the joy.dtd file that define a <mainWindow> element. As shown therein, FIG. 8 contains two XML processing instructions. XML processing instructions begin with a less than (<) sign followed by an exclamation point (!). They are commands to the XML parser (the object that reads the XML document and processes its content). The first processing instruction (!ELEMENT) declares an element called mainWindow, and states which elements may be nested within a <mainWindow> element. The second processing instruction (!ATTLIST) specifies which attributes a <mainWindow> element may have. Attribute definitions specify the attribute's name, its type, its initial value, and whether it is required or optional. XML pre-defines certain attribute types. The NMTOKEN attribute type specifies that an attribute's value must conform to XML's format for identifiers (a string of characters that contain no white space, and do not begin with a digit, and must comprise a combination of letters, digits, or underscores). The CDATA attribute type specifies that an attribute's value may be a string that is not processed by the XML parser. The XML parser will report a syntax error if, during parsing or rendering, it finds an attribute value within an XML document that does not match the attribute type specified within the document's DTD.

In FIG. 8, some of the attribute's types are specified by entity references. In this embodiment, entity references begin with a percent sign, followed by the entity's name, followed by a semi-colon (eg % borders in FIG. 8). Entities may be considered as being similar to variables in a typical programming language. An entity is an identifier that represents a value. A developer can place an entity reference within an XML DTD whenever they want to refer to the entity's value. The entity's identifier may thus be considered as an abbreviation for the entity's value. FIG. 8 contains three entity references—% borders, % Window Locations, and % boolean values. FIG. 9 shows those entities' definitions within the joy.dtd file. It will be evident to one skilled in the art that the entities described are illustrative of the features of the invention, and that other entities can be used within the scope of the invention.

Within the XML shown in FIG. 8, entities are used to specify the set of allowed values for some of the attributes. For example, the following line:

| opaque | %booleanValues; | "false" |
| --- | --- | --- | indicates that the opaque attribute can have one of the following values: true, false, yes, no, on, or off, with off being the default value.

Many of the attributes shown in FIG. 8 have a default value of #IMPLIED. This is a pre-defined value in XML that indicates that the attribute's value does not have to be specified within an XML document (the attribute can be omitted within an element). The inverse of #IMPLIED is #REQUIRED, which specifies that the attribute must appear within the element, and must be assigned a value. FIG. 9 shows various entity definitions including the three described above and referred to in FIG. 8.

2. Architecture

One embodiment of the User Interface Library comprises a set of Java classes and interfaces. Appendix C illustrates an example of such classes and interfaces as placed within a Java package called com.bea.joy. This package is the root package for the library, and includes the library's main class, called BEAtitude. The BEAtitude class relies on the Simple API for XML (SAX) library. SAX is a class library defined by the World Wide Web Consortium (W3C) for dealing with a stream of XML content. In one embodiment the Interface Library utilizes Sun Microsystems' implementation of the SAX library, although it will be evident that other interface library implementations can be used. The SAX library is used to read XML documents and to parse or render their content. The XML parser within the SAX library notifies the main (BEAtitude) class whenever it recognizes an XML element and its attributes. The BEAtitude class, in turn, notifies other classes within the Interface Library when the parser recognizes an element. In this particular embodiment, the library's design segregates the classes within the Interface Library into three sub-packages called: com.bea.joy.elements, com.bea.joy.components, and com.bea.joy.event. FIG. 10 shows a Unified Modeling Language (UML) package diagram of the Joy library, showing these three sub-packages.

The classes within the com.bea.joy.elements package represent various elements within XML documents. These classes are responsible for creating and configuring the actual user interface components that correspond to the elements in the XML document. The com.bea.joy.components package contains classes which define the user interface components that the classes in the com.bea.joy.elements package create. The com.bea.joy.event package contains classes used by the User Interface Library to notify an application of events that occur when the Interface Library constructs a user interface.

For example, in a situation in which a <mainWindow> tag is encountered by the XML parser, the parser notifies the BEAtitude class, which in turn notifies the MainWindowElement class within the com.bea.joy.elements package. The MainWindowElement class creates a main window component, and uses the values of the mainwindow element's attributes to configure or render the main window component.

The UML sequence diagram shown in FIG. 11 illustrates the sequence of this process. In FIG. 11, the chain of events is started by the parser (in this instance an XML validating parser from Sun's com.sun.xml.parser package). The parser calls the BEAtitude class' startElement method when it recognizes an XML element (this behavior is defined by the SAX standard). The parser passes the BEAtitude class the name of the element (in this case, "mainwindow") together with a pointer to a data structure that contains the element's attributes. The BEAtitude class uses the element's name to find a Java class that represents that element. That class is responsible for creating and configuring the user interface component that the element represents. It does this in a way that has been designed for maximum extensibility. The library does not make any a priori assumptions about which XML elements yield which GUI components. Instead, the library uses an element's name to look for a class that handles that element, and dynamically loads that class into the JAVA Runtime Environment. In the Java programming language, a running application can load and execute new application code from a local file, or from a file located on a network.

The library's extensibility takes advantage of the internationalization and localization features inherent in the JAVA language itself. Within JAVA, a class can have an associated property file. A property file is a text file that contains name-value pairs. The property file is loaded into the JAVA runtime environment along with its associated class. A JAVA class can retrieve the values specified within a property file by their name. In one embodiment of the invention, the BEAtitude class uses this property file lookup mechanism to find out which class' create method it should call for an XML element.

Figure 13:
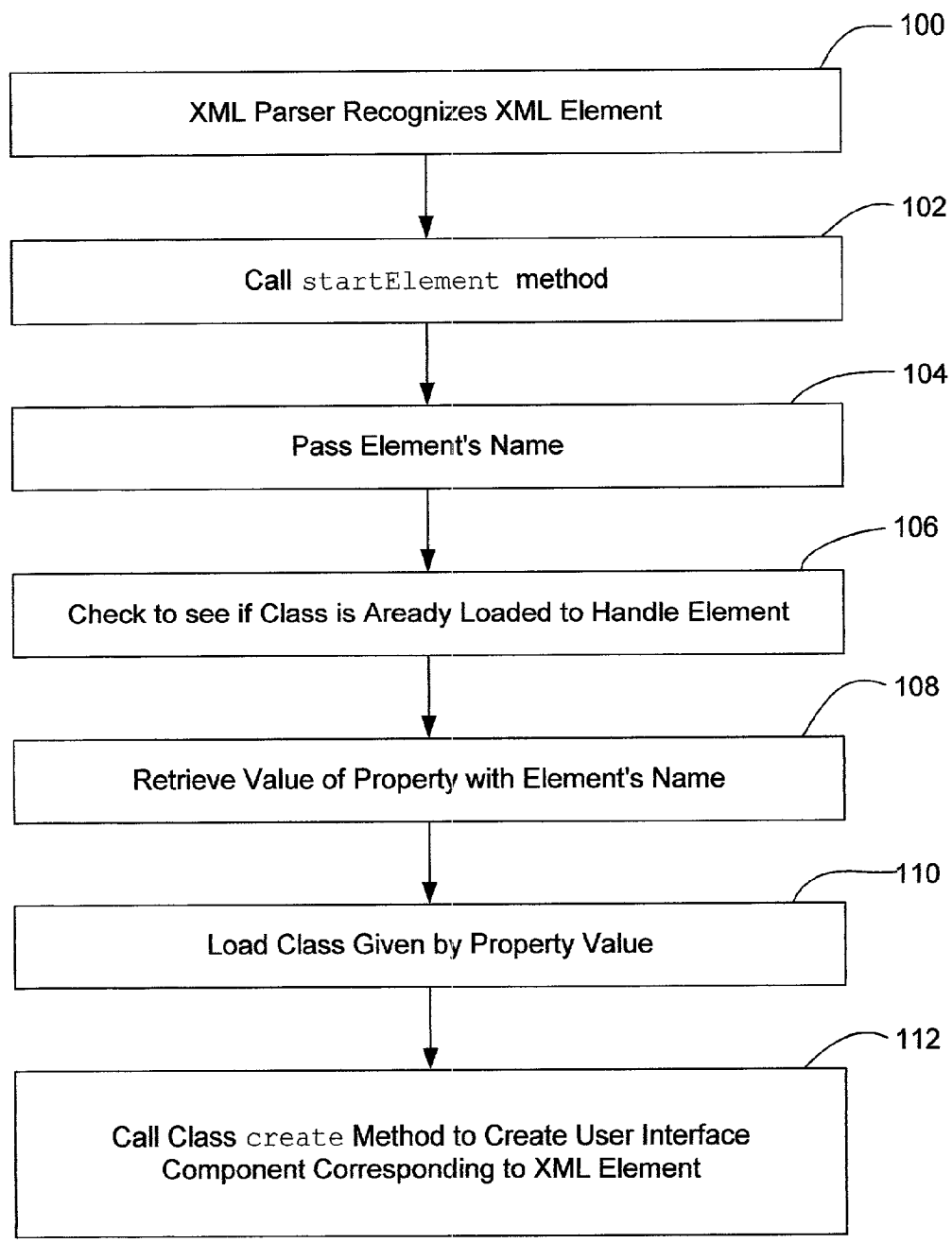
FIG. 13 shows a flowchart of a process used to parse a property file and generate an application interface.

FIG. 12 shows a segment of a property file for the BEAtitude class. Each line within the BEAtitude class' property file shown in FIG. 12 contains the name of an XML element, followed by an equal sign, followed by the name of a JAVA class whose create method the BEAtitude class calls when the element is encountered by the XML parser. FIG. 13 illustrates a particular embodiment of the process used by the invention to parse the property file and generate the graphical user interface, an example of which is shown in FIG. 14, and described in further detail below. As shown in FIG. 13, when the XML parser recognizes an XML element in step 100, it calls the BEAtitude class' startElement method (step 102) and passes to it the element's name (step 104). The BEAtitude class checks to see to see if it has already loaded a class into the JAVA Runtime Environment (JRE) to handle an element with that name (step 106). If it has not, it then retrieves the value of the property with the element's name from the property file (step 108). It then attempts to load a class into the JRE, whose name is given by the property's value (step 110). The BEAtitude class calls that class' create method in order to create a user interface component that corresponds to the XML element (step 112).

The create method is passed three parameters:
1. The parent component of the component that the create method creates.
2. An object that represents the XML element that the current element is nested within.
3. A hash table that maps the names of the element's attributes to their values.

In the example depicted in FIG. 11, the BEAtitude class finds and loads the MainWindowElement class in response to the parser recognizing a mainwindow element. The BEAtitude class then calls the MainWindowElement class' create method. The create method first creates a new JoyMainWindow object. It then calls its own configure method. The configure method takes the hash table passed to the create method, and uses the values within this hash table to set the corresponding properties of the JoyMainWindow object. The create method then calls the addToParent method of the parent element that was passed to it. The addToParent method is responsible for adding a component to its parent component. The create method then returns the JoyMainWindow object back to the BEAtitude class.

The Interface Library utilizes an event-driven architecture in order to increase processing speed and reduce memory requirements. In this manner, the BEAtitude class does not need to construct an in-memory copy of the XML documents that it processes. Instead, it simply creates and configures the proper GUI components in response to messages it receives from the XML parser while the parser is processing the XML documents.

The benefits of this type of architecture include its flexibility and extensibility. Developers can extend the library so that it creates new types of user interface components, and enforces different user interface guidelines. They can do this without having to alter the library's source code. Developers can also extend the User Interface Library to handle new XML elements simply by adding new entries into the BEAtitude class' property file. Developers can also supply their own DTDs because the Interface Library does not depend on a particular DTD.

As it is used herein, a DTD effectively specifies a grammar that XML documents must then conform to. Because XML documents fed into the Interface Library are used to construct a user interface, the documents' DTDs further define a grammar for the resulting user interface. In this manner, the DTDs become a formal specification of user interface guidelines that the Interface Library enforces. For example, the default DTD included in the Interface Library (joy.dtd) and shown in FIG. 8 enforces the guideline that an application must contain at least one main window. Any developer can use the Interface Library to enforce his or her own particular user interface guidelines simply by providing a different DTD. that the Interface Library uses to create the application's actual graphical user interface. The second file will contain the application's source code or logic.

The process begins by creating the XML document for the Bliss application's user interface. Using a text editor, an empty text file called Bliss.xml is created (the full Bliss.xml file is included in Appendix A, while the source code for the application is included in Appendix B). The XML standard requires that all XML documents begin with an XML declaration, and that declaration must be the very first thing within the document, so the following text is inserted at the start of the document:

<?xml version="1.0"?>

This is the XML document's declaration. In particular, it specifies that the document conforms to the XML version 1.0 specification (the latest version of the XML specification at the time that this document was written). The XML specification also requires that an XML document type declaration (DTD) must follow the XML declaration. The DTD specifies the document's type and the grammatical rules that the document adheres to. In this example, the Joy library's default document type definition is used., but it will be evident to one skilled in the art that the Interface Library is not limited to using a particular DTD. Indeed, any DTD may be substituted. For example, it may be desirable to have this flexibility to allow the Interface Library to enforce a particular set or plurality of user interface standards. In this example, to use the Joy DTD, the following line is inserted into the document after the XML declaration:

3. Development of a Sample Application

This section includes a tutorial that demonstrates how JAVA programmers can use the User Interface Library in accordance with an embodiment of the invention. In this tutorial, a particular embodiment of the invention and of the User Interface Library, herein referred to as "Joy",is used to construct a simple text editor application. This simple editor application allows users to open a text file, view the contents of the file, edit the file, and save any changes. As referred to herein the application is called "Bliss". FIG. 14 shows an illustration or screenshot of what Bliss looks like.

This simple exemplary application will allow the user to carry out the following actions.

1. Create a new text document.
2. Open an existing text document.
3. Save the text displayed within the application to a file (either a new file or an existing file).
4. Cut text from the document into the system clipboard.
5. Copy text from the document into the system clipboard.
6. Paste text from the system clipboard into a document.
7. Delete text.
8. Display a document's text.
9. Allow the user to edit a document's text.

To use the Interface Library to create the application, it is necessary for the developer to create two files. The first file is an XML document

```
<!DOCTYPE joy SYSTEM
    "file:/beadev/src/com/bea/joy/xml/joy.dtd">
```

The URL within quotes signifies the file that contains the Joy library's DTD. This URL may (and typically will) be different on other systems, depending on where the Joy library is installed on that system. Instead of a URL a fixed file locator (eg, c:\dtd\joy.dtd) could be used.

Because we are using the Joy DTD, the first element within the document must be the <joy> element. The DTD defines what attributes the <joy> element can have, and what elements can be nested within a <joy> element. FIG. 15 shows the rules in the DTD that defines the <joy> element. The rules specify that a <joy> element may optionally contain zero or more <action> elements, followed by zero or one <model> elements, followed by a combination of <component>, <mainwindow>, or <splashWindow> elements. The <joy> tag describes an application by specifying the set of actions the user interface supports, and what windows make up or compose the application. In this example, the <joy> element may have two attributes: helpDocument and lookAndFeel. Both of these attributes are optional. The helpDocument attribute specifies the URL of an XML document that defines the contents of the application's on-line help system. The lookAndFeel attribute specifies the application's look-and-feel.

At the time of writing, the SWING User Interface Library (which an embodiment of the User Interface Library is built upon) currently supports four different user interface standards (look-and-feels). These include: Metal, Motif, Windows, and Macintosh. The valid values for the lookAndFeel attribute are defined by the lookAndFeels entity. FIG. 16 shows an example of the entity's definition. As shown therein, the value default indicates that the user interface should conform to the look-and-feel of the computer that the particular application is running on (for example Microsoft Windows for PCs, Macintosh for Apple systems, Motif for UNIX, etc.) The value metal indicates that an application should use Java's cross-platform metal look-and-feel. For this example application, we'll use the Metal look-and-feel. To do so, the following two lines are added to the Bliss.xml file:

```
<joy lookAndFeel="metal">
</joy>
```

The rest of the elements that will later be added to this file will be inserted between the <joy> element's start and end tags. These additional elements will define the actions and components that make up the Bliss application's user interface.

The Joy DTD specifies that action elements must appear in the XML document before any elements that represent user interface components (as shown in the definition of the <joy> element shown in FIG. 15). As used herein, an action is a named event, that is reported when the user activates a user interface component. For example, a button component generates an action when the user presses that button, a menu item generates an action when the user selects that item from the menu. Different components may generate different actions, or many components can generate the same action. The <action> element defines actions within an XML document. To associate an action with a component, the action attribute of the component's element is set to the name of the action. FIG. 17, an extract of which is shown below, shows an XML document that defines an "open" action and associates that action with both a menu item and a toolbar button.

```
<!DOCTYPE joy SYSTEM
    "file:/beadev/src/com/bea/joy/xml/joy.dtd">
<joy lookAndFeel="metal">
    <action name="open"/>
    <mainwindow>
        <menuBar>
            <menu text="File">
                <menuItem name="openMenuItem"
                    action="open"
                    text="Open">
                </menuItem>
            </menu>
        </menuBar>
        <toolbar>
            <button name="openButton"
                action="open"
                text="Open">
            </button>
        </toolbar>
    </mainwindow>
</joy>
```

Actions are used to tie an application's user interface to an application's logic (i.e to the application logic source code). An application can ask the library for the actions that were previously defined in the XML documents which the library had processed during parsing. An application can then register to be notified when these actions or events occur, and can define what particular application logic can be executed when an action occurs. Applications can also enable or disable actions. Disabling an action disables all components associated with that action. Correspondingly, enabling an action enables all components associated with that action. Limiting the interaction between the user interface and the application logic to actions provides a number of benefits, in that the visual arrangement or "look-and-feel" of components in the user interface can be modified without disturbing the underlying application logic. Also, the underlying application logic can be reused without requiring a new user interface (for example, the application logic can be placed inside an Enterprise JAVA Bean). FIG. 18 (a portion of which is listed below) shows the rules within the Joy DTD that define the action element.

```
<!ELEMENT action  EMPTY>
<!ATTLIST action  enabled      %booleanValues;   "true"
                  icon         CDATA             #IMPLIED
                  name         CDATA             #REQUIRED
                  rolloverIcon CDATA             #IMPLIED
                  statusIcon   CDATA             #IMPLIED
                  statusMessage CDATA            #IMPLIED>
```

In accordance with one embodiment, action elements are empty, and cannot contain other elements. They must also have or include a name attribute. The value of this name attribute is used to associate components with the action. Other attributes may be optional; these include in this example icon, rolloverIcon, statusIcon, and statusMessage. These attributes are used to specify default values for the corresponding attributes of components that are associated with the action. For example, the system may be instructed to specify that the menu item and button defined in FIG. 17 should both have the same icon by changing the <action> element to the following:

```
<action name="open"
    icon="images/open_folder16x16bw.gif"/>
```

This specifies that the default value for the icon attribute of any component element associated with the action named open is images/open_folder16x16bw.gif. The default values specified within an action element can be overridden by an element that refers to the action. For example, if it was desired that the button defined in FIG. 17 should have a different icon than the menu item, the <button> element may be changed to the following:

```
<button name="openButton"
    action="open"
    icon="images/open_folder32x32bw.gif"
    text="Open">
</button>
```

Figure 22:
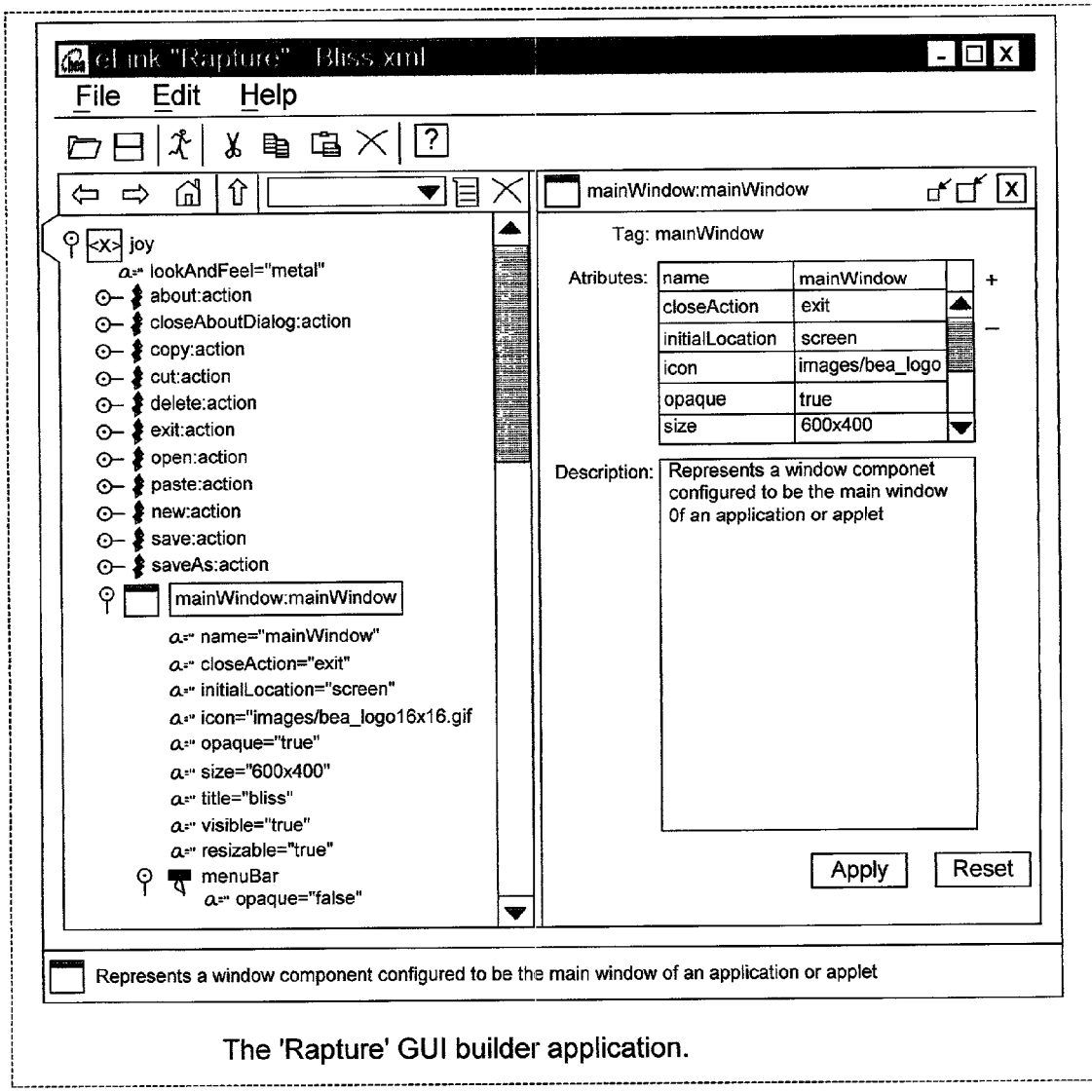
FIG. 22 shows an exemplary GUI builder application referred to herein as "Rapture".

As it would be provided to a developer, the User Interface Library includes sample or default icons. FIG. 22 shows an example of the range of icons that can be used within the Bliss application. The actions of the Bliss application are next defined by inserting the following into the Bliss. xml file between the start and end tags of the <joy> element:

```
<action name="about"
    icon="images/about16x16bw.gif"
    rolloverIcon="images/about16x16.gif"
    statusMessage="Display information about this
application."/>
    <action name="closeAboutDialog"/>
    <action name="copy"
        icon="images/copy16x16bw. gif"
        rolloverIcon="images/copy16x16.gif"
        statusMessage="Copy the selected text to the
```

-continued

```
clipboard."/>
    <action name="cut"
        icon="images/cut 16x16bw.gif"
        rolloverIcon="images/cut16x16.gif"
        statusMessage="Move the selected text to the
clipboard."/>
    <action name="delete"
        icon="images/delete16x16bw.gif"
        rolloverIcon="images/delete16x16.gif"
        statusMessage="Delete the selected text."/>
    <action name="exit"
        icon="images/exit16x16bw.gif"
        rolloverIcon="images/exit16x16.gif"
        statusMessage="Quit this application."/>
    <action name="open"
        icon="images/open_folder16x16bw.gif"
        rolloverIcon="images/open_folder16x16.gif"
        statusMessage="Open an existing document."/>
    <action name="paste"
        icon="images/paste16x16bw.gif"
        rolloverIcon="images/paste16x16.gif"
        statusMessage="Paste the text in the clipboard
into the document."/>
    <action name="new"
        icon="images/document16x16bw.gif"
        rolloverIcon="images/document16x16.gif"
        statusMessage="Create a new document."/>
    <action name="save"
        icon="images/save16x16bw.gif"
        rolloverIcon="images/save16x16.gif"
        statusMessage="Save this document."/>
    <action name="saveAs"
        icon="images/save_as16x16bw.gif"
        rolloverIcon="images/save_as16x16.gif"
        statusMessage="Save this document to a
different file."/>
```

Now that the application's actions have been defined, the application's graphical components need to be defined. In the example here, the application's user interface comprises a main window that contains a menu bar with drop-down menus, a toolbar with buttons, a scrollable text editor, and a status bar. FIG. 19 illustrates the hierarchy of components within the Bliss application's user interface. Typically, the first component defined for the application may be its main window. This is done by adding the following to the Bliss.xml file immediately after the <action> elements:

```
<mainwindow name="mainwindow"
    closeAction="exit"
    initialLocation="screen"
    icon="images/bea_logo16x16.gif"
    opaque="true"
    size="600x400"
    title="Bliss"
    visible="true">
</mainwindow>
```

The XML example code shown above defines a main window for the application that will be centered on the user's screen when it first appears. The main window will initially be 600 pixels wide by 400 pixels high, its title will be "Bliss," and its title bar icon will be a BEA Systems, Inc. logo. The XML also specifies that the main window will generate the action named 'exit' when the user closes it. Next, a menu bar, a tool bar, and a client area are added to the main window. To do this, the following lines are added between the start and end tags of the <mainwindow> element:

```
<menuBar>
</menuBar>
<toolbar>
</toolbar>
<clientArea>
</clientArea>
```

The client area of the main window is the area of the main window that is left over or remains after space has been allocated to the main window's menu bar, toolbars, and status bar. Now the drop-down menus are defined in the main window's menu bar by inserting the following into the Bliss.xml file between the starting and ending tags of the <menuBar> element:

```
<menu name="fileMenu"
    mnemonic="F"
    opaque="true"
    text="File">
  <menuItem name="openMenuItem"
      accelerator="Ctrl+O"
      action="open"
      mnemonic="O"
      text="Open...">
  </menuItem>
  <menuItem name="saveMenuItem"
      accelerator="Ctrl+S"
      action="save"
      mnemonic="S"
      text="Save">
  </menuItem>
  <menuItem name="saveAsMenuItem"
      accelerator="Ctrl+A"
      action="saveAs"
      mnemonic="a"
      text="Save As...">
  </menuItem>
  <menuItem name="newMenuItem"
      accelerator="Ctrl+N"
      action="new"
      mnemonic="N"
      text="New">
  </menuItem>
  <separator/>
  <menuItem name="exitMenuItem"
      action="exit"
      mnemonic="x"
      text="Exit">
  </menuItem>
</menu>
<menu name="editMenu"
    mnemonic="E"
    opaque="true"
    text="Edit">
  <menuItem name="cutMenuItem"
      accelerator="CTRL+x"
      action="cut"
      mnemonic="t"
      text="Cut">
  </menuItem>
  <menuItem name="copyMenuItem"
      accelerator="CTRL+c"
      action="copy"
      mnemonic="C"
      text="Copy">
  </menuItem>
  <menuItem name="pasteMenuItem"
      accelerator="CTRL+V"
      action="paste"
      mnemonic="P"
      text="Paste">
  </menuItem>
  <menuItem name="deleteMenuItem"
      accelerator="delete"
      action="delete"
      mnemonic="D"
      text="Delete">
  </menuItem>
</menu>
<menu name="helpMenu"
    mnemonic="H"
    opaque="true"
    text="Help">
  <menuItem name="aboutMenuItem"
      action="about"
      mnemonic="a"
      text="About Bliss">
  </menuItem>
</menu>
```

Figure 20:
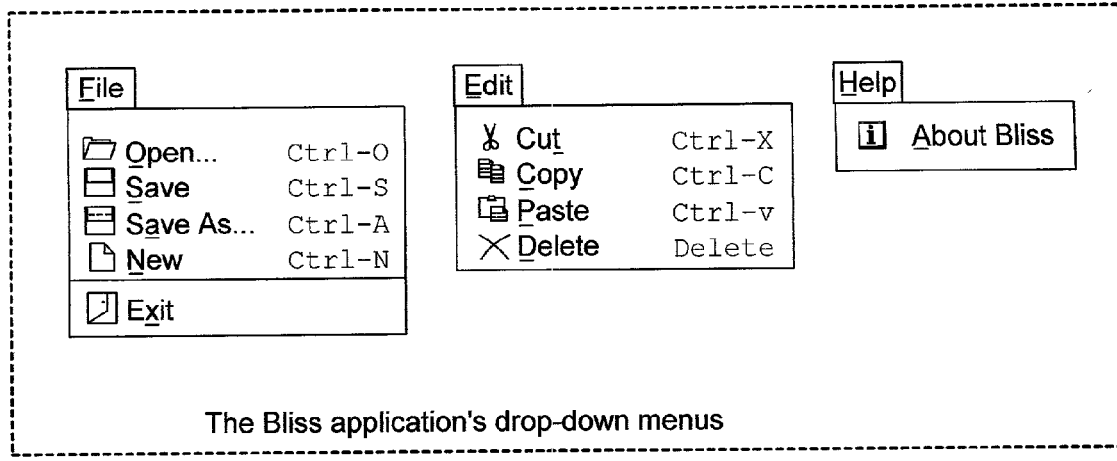
FIG. 20 shows the Bliss application's drop-down menus.

The above XML defines the application's three pull-down menus. FIG. 20 shows what these menus look like. Now that the application's user interface is defined, the application itself can be built. In this example, JAVA is used, and so the application is created by writing the source code for a JAVA class called Bliss. The Bliss.xml file is saved and, using a JAVA source code editor, a new file called Bliss.java is created. Then the following text is inserted into the new file:

```
import java.io.IOException;
import com.bea.joy.IUserInterfaceBuilder;
import com.bea.joy.Joy;
public class Bliss
{
  public Bliss( )
  {
    IUserInterfaceBuilder guiBuilder =
    Joy.createUserInterfaceBuilder ( );
    try
    {
      guiBuilder.buildUserInterface ( "Bliss.xml" );
    }
    catch ( IOException exception )
    {
      exception.printStackTrace( );
    }
  }
  public static void main ( String astrArgs )
  {
    Bliss bliss = new Bliss ( );
  }
}
```

Typically, this file can be saved in the same directory as the Bliss.xml file. The JAVA source code above provides a minimum necessary to illustrate and test the XML file parsing process. It contains a main method that is called when the application is started. The main method creates an instance of the Bliss class. The Bliss class' constructor calls the createUserInterfaceBuilder method of the Joy class, which returns an object that will build the application's user interface. The application then calls the createUserInterface method of the builder object, passing to it the name of the XML file that defines the application's user interface. The createUserInterface method throws an IOException if it cannot find the file, or if it cannot read the file. It will be evident to one skilled in the art that the JAVA file shown above is merely an illustration, and that other, more complex, source code and application logic can incorporate or embody the features of the invention while remaining within the spirit and scope of the invention.

The application is now compiled by running the following command within a command shell whose current working directory is the same directory where the Bliss.java file is stored.

```
javac -classpath .;\beadev\src;\xml-tr2\xml.jar
   Bliss.java
```

The directories \beadev\src and \xml-tr2\xml.jar may (and typically will) be different for the particular computer system on which the devlopment suite is deployed. The first directory specifies the root directory where the User Interface Library is located. The second directory specifies the location of an XML library, for example Sun Microsystem's XML library. The above command is applicable to Microsoft Windows NT systems. On other operating systems—particularly variants of UNIX—the backslashes (\) must be replaced with forward slashes (/). Once the command is run without errors, a file called Bliss.class will be created within the directory. The application can then be executed by entering the following command:

```
java -classpath .;\beadev\src;\xml-
   tr2\xml.jar;\beadev\src\joy Bliss
```

There may be a need to alter the previous command to match differences between operating systems and the locations of the Interface Library and the XML library (i.e. Sun Microsystem's XML library). Once this command is executed—again, assuming that no errors are encountered—the Bliss application's user interface is generated. Notice that this particular application is merely given for exemplary or illustrative purposes and doesn't actually do much. This is because, although the application's actions have been defined, the application's logic for handling those actions has not at this point yet been written. For example, the application cannot be stopped from the application's user interface (closing the application's main window hides the window, but it does not stop the application). Without these features, to stop the application, it would be necessary to go to the command shell the application was started, and press CTRL+C or the interrupt key.

To account for this, now that the application's user interface has been built, logical code can be added to the application that will enable it to react to actions. To get the application to do something useful, two things must be done. First, the application needs to get references to some of the components created by the Joy library. Second, the application needs to register that it wants to be notified when actions occur. The first step is accomplished by using the addComponentCreatedListener (listener) method of the IUserInterfaceBuilder interface. The signature for this method follows:

```
public void addComponentCreatedListener( String
   strComponentName,
   ComponentCreatedListener listener )
```

The first parameter is the name of a component, while the second parameter is a listener object that the Interface Library notifies when it creates a component whose name matches the first parameter. The Interface Library notifies the listener object by calling the listener's componentCreated method.

The componentCreated method has the following signature:

```
public void componentCreated ( ComponentCreatedEvent
   event )
```

The ComponentCreatedEvent class provides a method that allows the listener to determine what component was created. This method is called getCreatedComponent, (getComponent) and has the following signature:

```
public Component getCreatedComponent( )
```

With these methods (Listener and getComponent), the Bliss application can obtain a reference to any named component that the Interface Library creates. Next, the application needs to be notified when actions happen. The IUserInterfaceBuilder interface provides a method to do this. The method's signature is:

```
public void addActionListener( String strActionName,
   ActionListener listener )
``` where the second parameter is an object that wants to be notified when an action occurs, and the first parameter is the name of the action that the listener wants to be notified of. In order for this method to work, it must be called on a IUserInterfaceBuilder object before the IUserInterfaceBuilder object's create user interface method is called. After the addActionListener method is called, the listener object's actionPerformed method will be called whenever an action with the given name occurs.

In this example, the first action the application will handle is an 'exit' or 'close' action. The lines below are inserted into the Bliss.xml file.

```
import java.io.IOException;
import com.bea.joy.IUserInterfaceBuilder;
import com.bea.joy.Joy;
import java.awt.ActionEvent;
import java.awt.ActionListener;
public class Bliss
{
public Bliss ( )
{
BEAtitude guiBuilder = new BEAtitude ( );
guiBuilder.addActionListener (
    "exit",
    new ActionListener ( )
```

-continued

```
        {
            public void actionPerformed (ActionEvent event )
            {
                System.exit ( 0 );
            }
        } );
        try
        {
            IUserInterfaceBuilder guiBuilder =
                    Joy.createUserInterfaceBuilder ( );
        }
        catch ( IOException exception )
        {
            exception.printStackTrace ( );
        }
    }
    public static void main ( String astrArgs )
    {
        Bliss bliss = new Bliss ( ) ;
    }
}
```

Now the application is again compiled and run. This time, the application stops executing whenever the 'Exit' menu item in the 'File' menu is selected, or the application's main window is closed. In order to handle the application's other actions the application needs to manipulate its text area component. The lines in the following source code fragment are added to the Bliss.java file. These lines create a data member of the Bliss class that is used to hold a reference to the application's text area component. It also initializes this data member by getting a reference to the text area component from the User Interface Library.

```
import java.io.IOException;
import com.bea.joy.IUserInterfaceBuilder;
import com.bea.joy.Joy;
import java.awt.event.ActionEvent;
import java.awt.event.ActionListener;
import com.bea.joy.event.ComponentCreatedEvent;
import com.bea.joy.event.ComponentCreatedListener;
import javax.swing.JTextArea;
public class Bliss
{
    private JTextArea m_TextArea = null;
    public Bliss ( )
    {
        IUserInterfaceBuilder guiBuilder =
            Joy.createUserInterfaceBuilder ( );
            guiBuilder.addComponentCreatedListener (
                "textArea",
                new ComponentCreatedListener ( )
                {
                    public void componentCreated
                    ( ComponentCreatedEvent event )
                    {
                        m_TextArea =
                        (JTextArea) event.getCreatedComponent ( );
                    }
                } );
```

Next, a dialog window will be added to the application that displays information about the application when the user selects the application's 'About Bliss' menu item from the application's 'Help' menu. The application's about dialog will use the image file named bliss_splash.jpg which is located in the User Interface Library's images directory. To define the about dialog, the following XML is added to the Bliss.xml file, before the end tag of the <mainwindow> element.

```
<aboutDialog name="aboutDialog"
            title="About Bliss">
    <clientArea>
        <panel name="imagePanel">
            <image image="images/bliss_splash.jpg"/>
        </panel>
    </clientArea>
</aboutDialog>
```

In order to have the about dialog defined above appear when the user selects the "About Bliss" menu item in the application's "Help" pull-down menu, the application needs to get a reference to the about dialog window component, and be notified of when the "about" action occurs. To allow this, the following import statement is first added to the Bliss.java file:

```
import javax.swing.JDialog;
``` followed by the following data member declaration:

```
private JDialog m_AboutDialog = null;
```

Then the following is added to the Bliss class' constructor, before it calls the buildUserInterface method:

```
guiBuilder.addComponentCreatedListener (
    "aboutDialog",
    new ComponentCreatedListener ( )
    {
        public void componentCreated
        ( ComponentCreatedEvent event )
        {
            m_AboutDialog =
            (JDialog)event.getCreatedComponent ( );
        }
    } );
guiBuilder.addActionListener (
    "about",
    new ActionListener ( )
    {
        public void actionPerformed (ActionEvent event)
        {
            m_AboutDialog.setVisible ( true );
        }
    } );
```

Figure 21:
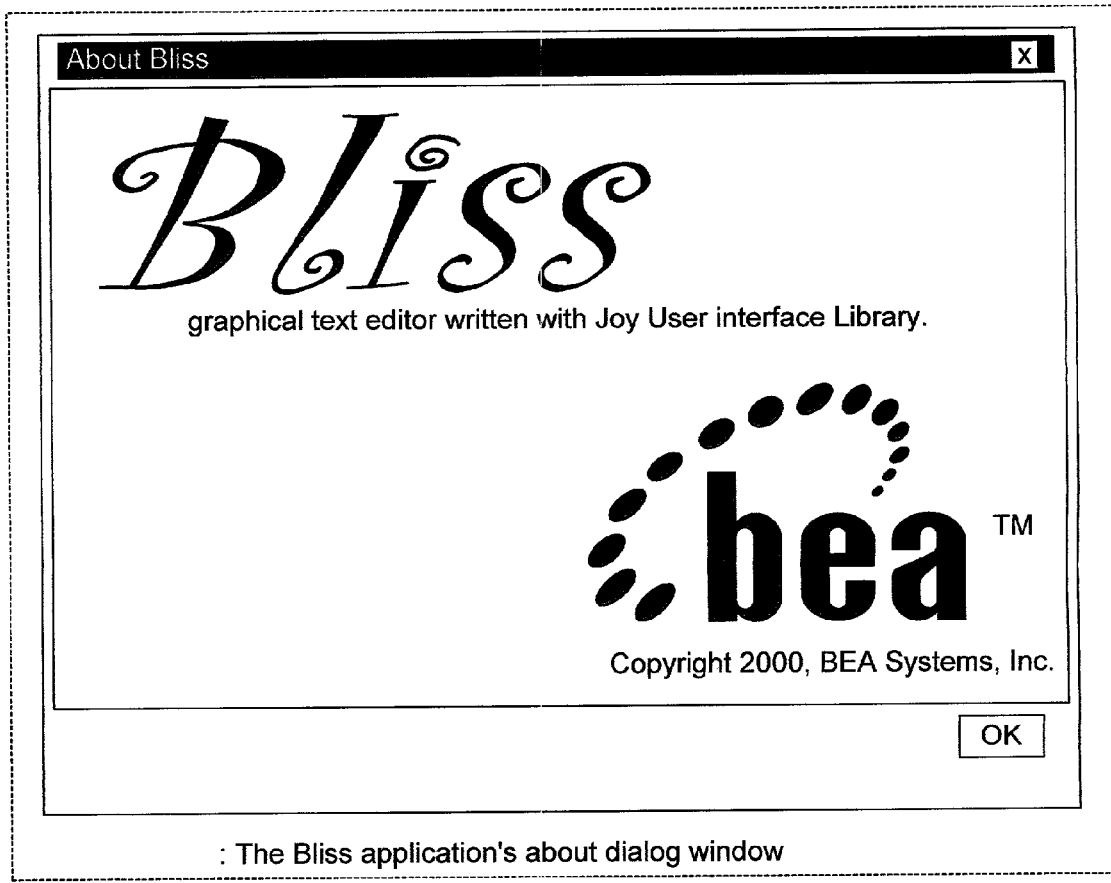
FIG. 21 shows the Bliss sample application's "about" dialog window.

The application is compiled and run again. When the "About Bliss" menu item is selected from the "Help" menu, the sample window or graphical display illustrated in FIG. 21 appears.

GUI Builder

FIG. 22 illustrates an exemplary, graphical based application that may be developed in accordance with the invention to allow a developer to easily manipulate and specify, through a series of hierarchical properties and input fields, a particular graphical user interface definition. The data entered through this graphical-based tool can then be used to define or generate the source interface XML file, and hence the interface itself. The graphical-based tool, (referred to as 'Rapture') eliminates a need for the developer to manipulate the XML files directly, and greatly increases the usability of any development suite that incorporates the invention.

4.1 Benefits for Developers

This section discusses the benefits and advantages provided by the invention for software application developers.

Less Coding

An application's GUI can be described by XML documents, rather than having to build the user interface through JAVA programming.

Faster Development, Support for Rapid Prototyping

Changing an application's user interface does not require recompiling the application. Developers can edit the XML documents, and immediately see the results when they re-run their application.

Greater Independence of User Interface from Application Logic

The library allows programmers to segregate an application's user interface from its core functionality. The user interface is described within XML documents that define user actions. The application's non-user interface code is notified when actions occur.

Support for Internationalization and Customization

The library is built on top of JAVA's internalization and localization features. Because the application logic is freed from the user interface, it is easier to modify the user interface for different languages and locales without disrupting the application's core logic.

Code Re-Use, Formal Specification of GUI Standards

The User Interface Library allows user interfaces to be specified at a higher level of abstraction than if they were written in a programming language. For example, the default DTD defines that an application must contain one main window that can have a menu bar and a toolbar. It also ties components together, for example, ensuring a component's status information is displayed within a window's status bar. It also provides higher-level constructs that are made up of collections of components (for example, dialog windows, main windows, tree view navigators, etc.)

Extensible

The Interface Library can be extended to handle new XML elements and new GUI components without having to be re-compiled. New XML elements, and the classes that create the element's corresponding user interface components are specified within the library's property file.

Modularity

The classes that are responsible for providing a user interface (the components) and the classes that are responsible for creating the components (the elements) are segregated into separate packages. The responsibility for processing XML rests solely with the element classes. Providing a graphical user interface relies solely with the component classes (they have no knowledge of XML or how they were constructed). This allows programmers to concentrate on their application's logic, and on solving application domain problems rather than low-level user interface design and construction issues.

Familiarity

One embodiment of the Interface Library of the invention is based on the SWING API. A programmer who is familiar with SWING can immediately use the invention as thus embodied. All user interface components created by the Interface Library are returned as SWING classes. This means that a programmer can treat these components as standard SWING components. Programmers do not have to learn new class hierarchies and methods; they can treat objects created by the Interface Library as regular SWING objects created in the traditional way, by calling their constructors.

Other interface libraries can be used to greatly expand the applicability of the invention and the methods therein to other types of systems.

4.2 Benefits for End-Users

This section discusses the benefits and advantages provided by the invention for application end-users.

Common Look-and-Feel

The Interface Library enforces a common look-and-feel that users are familiar with. This can reduce training time for users.

Speed

The Interface Library relies on an event-driven processing model. It does not create or manage an in-memory data structure that represents the contents of the XML documents that it processes. This saves processing time and memory usage. After the XML documents are parsed, the only new objects that exist in memory are the user interface components created by the library.

Lightweight

The Interface Library allows an entire application's user interface to be transmitted as an XML document to the user's web browser, or possibly to their personal digital assistants and cell phones.

5. Logical System Architecture

A high-level logical overview or schematic of a system used to operate the invention is shown in FIG. 24. A system such as shown can be incorporated into a software application development system for the consistent, rapid, and easy development of graphically rich applications. As shown in FIG. 24, the system comprises a parser 112. During the application compilation process, the parser 112 uses information both in the application source code 102 and the user interface definition file 104 to create the applications' graphical user interface 114. During runtime this graphical user interface is then generated and presented to the user.

The development suite includes an interface class library 106, from which the application source code 102 selects graphical elements appropriately specified by the user interface definition file 104. Actions are used to tie an application's user interface to an application's logic. An application or application source code 102 can ask the library for the actions that are defined in the user interface definition file which the library had processed during compilation. An application can then register to be notified when these actions or events occur, and can define what particular application logic can be executed when an action occurs. Applications can also enable or disable actions.

A grammar file 108 determines rules and dependencies to be applied during the compilation/parsing process, and ensures consistency throughout the graphical user interface development process. The grammar file may be in some embodiments be a document type definition (DTD) file or an XML schema (XSD) file. In some embodiments a property file 110 can be used to map to a subset of graphical elements within the user interface definition file 104. The property file 110 can be a text file that is associated with a particular class (for example a Java class), and multiple property files may be associated with each class. At runtime the system loads the property files that match the user's language and locale settings. This feature allows applications to retrieve values in a language- and locale-independent manner, in support of internationalization and localization requirements.

In certain implementations the parser and library may considered a single entity—in which case the act of calling the library functions initiates or includes the parsing process.

INDUSTRIAL APPLICABILITY

As described above, the XML documents taken as input by the library specify which user interface components should be created (i.e. the content of the user interface). However, the XML documents also contain attributes that specify how the components should be arranged (i.e. their presentation). The goal of XML and XSL is to separate content from presentation. In some embodiments the graphical interface library can be extended so that the layout of components is expressed within XSL style sheets. This would allow the same graphical user interface specification to have different appearances. This would be useful when the same graphical user interface application needs to be accessed from various devices like personal computers, personal digital assistants, or cell phones.

The User Interface Library has been used by the inventor to create a GUI builder application. The application allows users to graphically construct XML documents that describe a user interface. The application, code-named Rapture, allows users to build an application's user interface by dragging components from a palette and dropping them onto a window. FIG. 22 shows the Rapture application, as it looks today. As shown in this figure, the application is displaying the contents of the bliss.xml file.

In other embodiments the invention can be used to form a personalized graphical applications interface. Using a thin client, for example a personal digital assistant device (PDA) or a wireless phone, a user may log onto or access an online resource. Since the application logic code is static but the functionality and appearance of the application is dependent on the XML file, the online resource may supply XML documents specific to that user (by, for example, reading the users login details). In this manner each client device, each user, and indeed each client device/user combination may access the same resource using the same application but receive different information, presented by a different graphical interface, and tailored to their requirements.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer implemented system for generating an application graphical user interface, comprising:
   a parser, for parsing an application source code file, application interface file, interface grammar file, and interface library, to dynamically generate an application graphical user interface;
   an application source code file for an application, specifying an application logic that is executed by actions generated by a plurality of graphical elements displayed for said application graphical user interface;
   an application interface file specifying said plurality of graphical elements within an interface library to be displayed for said application graphical user interface;
   an interface grammar file specifying rules to be used in parsing said application interface file; and
   an interface library comprising a plurality of graphical elements to be retrieved by said parser in accordance with the specifications of said application interface file and said interface grammar file.

2. The system of claim 1, further comprising:
   an interface propertyfile specifying a set of graphical elements within said interface library to be used by said application interface file.

3. The system of claim 1 wherein said application interface file is chosen from a plurality of available application interface files when a user logs in to the system.

4. The method of claim 3 wherein the application interface file to be used is selected dependent on the type of device used by the user.

5. The system of claim 1 wherein said interface library comprises a library of object oriented classes.

6. The system of claim 1 wherein said parser comprises means for:
   determining within said application source code file a reference to said application interface file;
   determining by reference to said interface grammar file whether a function call specified by said application source code file is allowed; and
   communicating said function call to said interface library.

7. The system of claim 1 wherein said application interface file is an extended markup language file which maps application screen component function calls to screen component classes.

8. The system of claim 7 wherein said interface grammar file is a document type description file which specifies the dependencies of the application screen component function calls to one another.

9. The system of claim 1 wherein said interface library comprises a set of screen component classes.

10. The system of claim 9 wherein said application source code file comprises function calls to at least one of said screen component classes.

11. A computer implemented system for development of an application graphical user interface, comprising:
   means for creating an application source code file specifying an application logic;
   means for creating an application interface file specifying a plurality of graphical elements within an interface library to be displayed for said application graphical user interface;
   means for creating an interface grammar file specifying rules to be used in parsing said application interface file;
   an interface library comprising a plurality of graphical elements to be retrieved in accordance with the specification of said application interface file and said interface grammar file; and
   a parser, for parsing said application source code file, said application interface file, and said interface grammar file, retrieving said plurality of graphical elements from said interface library, and dynamically generating an application graphical user interface, wherein said parser comprises means for
  determining within said application source code file a reference to said application interface file,
  determining by reference to said interface grammar file whether a function call specified by said application source code file is allowed, and
  communicating said function call to said interface library.

12. The system of claim 11, further comprising:
  an interface property file specifying a set of graphical elements within said interface library to be used by said application interface file.

13. The system of claim 11 wherein said application interface file to be used is chosen from a plurality of available application interface files when a user logs in to the system.

14. The method of claim 13 wherein the application interface file to be used is selected dependent on the type of device used by the user.

15. The system of claim 11 wherein said interface library comprises a library of object oriented classes.

16. The system of claim 11 wherein said application interface file is an extended markup language file which maps application screen component function calls to screen component classes.

17. The system of claim 16 wherein said interface grammar file is a document type description file which specifies the dependencies of the application screen component function calls to one another.

18. The system of claim 11 wherein said interface library comprises a set of screen component classes.

19. The system of claim 18 wherein said application source code file comprises function calls to at least one of said screen component classes.

20. A computer implemented system for allowing consistency verification of an application user interface for an application in a graphical user interface development system, comprising:
  an interface library comprising a plurality of graphical elements;
  means for parsing an application interface file, said application interface file specifying a plurality of graphical elements within said interface library to be displayed for said application;
  means for parsing an interface grammar file, said interface grammar file specifying rules to be used in parsing said application interface file and retrieving said pluralityof graphical elements; and
  means for retrieving from said interface library a plurality of graphical elements, in accordance with the rules applied by said interface grammar file during parsing;
  wherein said means for parsing further comprises means for
    determining within an application source code file a reference to said application interface file,
    determining by reference to said interface grammar file whether a function call specified by said application source code file is allowed, and
    communicating said function call to said interface library.

21. The system of claim 20, further comprising:
  an interface property file specifying a set of graphical elements within said interface library to be used by said application interface file.

22. The system of claim 20 wherein said application interface file to be used is chosen from a plurality of available application interface files when a user logs in to the system.

23. The method of claim 22 wherein the application interface file to be used is selected dependent on the type of device used by the user.

24. The system of claim 20 wherein said interface library comprises a library of object oriented classes.

25. The system of claim 20 wherein said application interface file is an extended markup language file which maps application screen component function calls to screen component classes.

26. The system of claim 25 wherein said interface grammar file is a document type description file which specifies the dependencies of the application screen component function calls to one another.

27. The system of claim 20 wherein said interface library comprises a set of screen component classes.

28. The system of claim 27 wherein said application source code file comprises function calls to at least one of said screen component classes.

29. A computer implemented method of developing a graphical user interface application, comprising the steps of:
  parsing an application interface file, application source code file, interface grammar file, and interface library, wherein
    said application interface file specifies a plurality of graphical elements within an interface library to be displayed for said graphical user interface application,
    said application source code file specifies an application logic that is executed by actions generated by said plurality of graphical elements displayed for said graphical user interface application, and
    said interface grammar file specifies rules to be used in parsing said application interface file; and
  retrieving from said interface library said plurality of graphical elements in accordance with the specifications of said application interface file and said interface grammar file.

30. The method of claim 29, further comprising:
  using an interface property file to specify a set of graphical elements within said interface library to be used by said application interface file.

31. The method of claim 29 wherein said application interface file to be used is chosen from a plurality of available application interface files when a user logs in to a system.

32. The method of claim 31 wherein the application interface file to be used is selected dependent on the type of device used by the user.

33. The method of claim 29 wherein said interface library comprises a library of object oriented classes.

34. The method of claim 29 further comprising:
  determining within said application source code file a reference to said application interface file;
  determining by reference to said interface grammar file whether the function call specified by said application source code file is allowed; and
  communicating said function call to said interface library.

35. The method of claim 29 wherein said application interface file is an extended markup language file which maps application screen component function calls to screen component classes.

36. The method of claim 35 wherein said interface grammar file is a document type description file which specifies the dependencies of the application screen component function calls to one another.

37. The method of claim 29 wherein said interface library comprises a set of screen component classes.

38. The method of claim 37 wherein said application source code file comprises function calls to at least one of said screen component classes.

39. A computer implemented method of development of an application graphical user interface, comprising the steps of:
creating an application interface file specifying a plurality of graphical elements within an interface library to be displayed for said application graphical user interface;
creating an application source code file specifying an application logic that is executed by actions generated by said plurality of graphical elements displayed for said graphical user interface application;
creating an interface grammar file specifying rules to be used in parsing said application interface file;
providing an interface library comprising said plurality of graphical elements to be retrieved in accordance with the specification of said application interface file and said interface grammar file;
parsing said application source code file, said application interface file, and said interface grammar file to determine a plurality of graphical elements to be retrieved from said interface library; and
retrieving said plurality of graphical elements from said interface library, and dynamically generating an application graphical user interface.

40. The method of claim 39, further comprising:
specifying via an interface property file a set of graphical elements within said interface library to be used by said application interface file.

41. The method of claim 39 wherein said application interface file to be used is chosen from a plurality of available application interface files when a user logs in to a system.

42. The method of claim 41 wherein the application interface file to be used is selected dependent on the type of device used by the user.

43. The method of claim 39 wherein said interface library comprises a library of object oriented classes.

44. The method of claim 39 further comprising:
determining within said application source code file a reference to said application interface file;
determining by reference to said interface grammar file whether a function call specified by said application source code file is allowed; and
communicating said function call to said interface library.

45. The method of claim 39 wherein said application interface file is an extended markup language file which maps application screen component function calls to screen component classes.

46. The method of claim 45 wherein said interface grammar file is a document type description file which specifies the dependencies of the application screen component function calls to one another.

47. The method of claim 39 wherein said interface library comprises a set of screen component classes.

48. The method of claim 47 wherein said application source code file comprises function calls to at least one of said screen component classes.

49. A computer implemented method for allowing consistency verification of an application user interface in a graphical user interface development system, comprising the steps of:
providing an interface library comprising a plurality of graphical elements;
providing means for parsing an application interface file, said application interface file specifying said plurality of graphical elements within said interface library to be displayed for said application user interface;
providing means for parsing an interface grammar file, said interface grammar file specifying rules to be used in parsing said application interface file and retrieving said plurality of graphical elements;
providing means for retrieving from said interface library said plurality of graphical elements, in accordance with the rules specified by said interface grammar file;
determining within an application source code file a reference to said application interface file;
determining by reference to said interface grammar file whether a function call specified by said application source code file is allowed; and
communicating said function call to said interface library.

50. The method of claim 49, further comprising:
an interface property file specifying a set of graphical elements within said interface library to be used by said application interface file.

51. The method of claim 49 wherein said application interface file to be used is chosen from a plurality of available application interface files when a user logs in to a system.

52. The method of claim 51 wherein the application interface file to be used is selected dependent on the type of device used by the user.

53. The method of claim 49 wherein said interface library comprises a library of object oriented classes.

54. The method of claim 49 wherein said application interface file is an extended markup language file which maps application screen component function calls to screen component classes.

55. The method of claim 54 wherein said interface grammar file is a document type description file which specifies the dependencies of the application screen component function calls to one another.

56. The method of claim 49 wherein said interface library comprises a set of screen component classes.

57. The method of claim 56 wherein said application source code file comprises function calls to at least one of said screen component classes.

58. A computer implemented method of creating an application graphical user interface, comprising:
using an application source code file specifying an application logic;
using an application interface file to specify a plurality of graphical elements within an interface library to be displayed for said application graphical user interface;
using an interface grammar file to specify rules to be used in parsing said application interface file;
accessing an interface library comprising said plurality of graphical elements to be retrieved in accordance with the specification of said application interface file and said interface grammar file;
parsing said application source code file, said application interface file, and said interface grammar file to determine a plurality of graphical elements to be retrieved from said interface library; and locating said plurality of graphical elements within said interface library, and using said plurality of graphical elements to generate said application graphical user interface;

determining within said application source code file a reference to said application interface file;

determining by reference to said interface grammar file whether a function call specified by said application source code file is allowed; and communicating said function call to said interface library.

59. The method of claim 58, further comprising:

specifying via an interface property file a set of graphical elements within said interface library to be used by said application interface file.

60. The method of claim 58 wherein said application interface file to be used is chosen from a plurality of available application interface files when a user logs in to a system.

61. The method of claim 60 wherein the application interface file to be used is selected dependent on the type of device used by the user.

62. The method of claim 58 wherein said interface library comprises a library of object oriented classes.

63. The method of claim 58 wherein said application interface file is an extended markup language file which maps application screen component function calls to screen component classes.

64. The method of claim 63 wherein said interface grammar file is a document type description file which specifies the dependencies of the application screen component function calls to one another.

65. The method of claim 58 wherein said interface library comprises a set of Java screen component classes.

66. The method of claim 65 wherein said application source code file comprises function calls to at least one of said screen component classes.

67. A computer implemented system for developing an application graphical user interface, comprising:

a parser, for parsing an application source code file, application interface file, interface grammar file, and interface library, to generate an application graphical user interface, wherein said parser comprises means for determining within said application source code file a reference to said application interface file, determining by reference to said interface grammar file whether a function call specified by said source code file is allowed, and passing said function call to said interface library;

an application source code file specifying an application logic wherein said application source code file comprises function calls to at least one of a plurality of Java screen component classes;

an application interface file specifying a plurality of graphical elements within an interface library to be displayed for said application graphical user interface, wherein said application interface file is chosen from a plurality of available application interface files, wherein said application interface file is an extended markup language file which maps application screen component function calls to screen component classes;

an interface grammar file specifying rules to be used in parsing said application interface file wherein said interface grammar file is a document type description file which specifies rules and dependencies of the application screen component function calls to one another; and an interface library comprising a plurality of graphical elements to be retrieved by said parser in accordance with the specification of said application interface file and said interface grammar file, wherein said interface library comprises a library of screen component classes.

\* \* \* \* \*